(12) United States Patent
Sheehan

(10) Patent No.: US 9,803,303 B2
(45) Date of Patent: Oct. 31, 2017

(54) MULTILAYERED PIPE VALVE INSULATION COVER

(71) Applicant: LTK INSULATION TECHNOLOGIES CO., INC., Bow, NH (US)

(72) Inventor: Thomas F. Sheehan, Bow, NH (US)

(73) Assignee: LTK Insulation Technologies, Co. Inc., Bow, NH (US)

( * ) Notice: Subject to any disclaimer, the term of this patent is extended or adjusted under 35 U.S.C. 154(b) by 504 days.

(21) Appl. No.: 14/468,830

(22) Filed: Aug. 26, 2014

(65) Prior Publication Data
US 2016/0061376 A1    Mar. 3, 2016

(51) Int. Cl.
| | |
|---|---|
| D05B 93/00 | (2006.01) |
| F16L 59/16 | (2006.01) |
| B32B 5/02 | (2006.01) |
| B32B 3/04 | (2006.01) |
| B32B 5/06 | (2006.01) |

(52) U.S. Cl.
CPC .......... *D05B 93/00* (2013.01); *B32B 3/04* (2013.01); *B32B 5/022* (2013.01); *B32B 5/06* (2013.01); *F16L 59/168* (2013.01); *B32B 2250/02* (2013.01); *B32B 2250/03* (2013.01); *B32B 2250/20* (2013.01); *B32B 2255/02* (2013.01); *B32B 2307/304* (2013.01); *B32B 2581/00* (2013.01)

(58) Field of Classification Search
CPC ....... D05B 93/00; D05B 93/02; F16L 59/168; B32B 3/04; B32B 3/06; B32B 3/08
USPC .................................................. 112/441, 440
See application file for complete search history.

(56) References Cited

U.S. PATENT DOCUMENTS

| | | |
|---|---|---|
| 780,843 A | 1/1905 | Wallace |
| 1,108,840 A | 8/1914 | Franke |
| 2,778,405 A | 1/1957 | Stephens et al. |
| 3,044,915 A | 7/1962 | Jacobsen |
| 3,557,840 A | 1/1971 | Maybee |
| 3,560,287 A | 2/1971 | Helling |
| 3,724,491 A | 4/1973 | Knudsen et al. |
| 4,009,735 A | 3/1977 | Pinsky |
| 4,046,406 A | 9/1977 | Press et al. |
| 4,112,967 A | 9/1978 | Withem |
| 4,142,565 A | 3/1979 | Plunkett, Sr. |
| 4,207,918 A | 6/1980 | Burns et al. |
| 4,259,981 A | 4/1981 | Busse |

(Continued)

*Primary Examiner* — Danny Worrell
(74) *Attorney, Agent, or Firm* — Davis & Bujold PLLC; Michael J. Bujold

(57) ABSTRACT

A multilayered nonwoven insulating barrier with an integral pocket for installation of a component to be insulated. The insulating barrier has nonwoven layers that overlap one another and are stitched to one another by first pair of seams to form an integral pocket therebetween. An elastic member is secured to one end of the insulating barrier to facilitate wrapping the end around and forming a seal. A second elastic member is secured to an opposite end of the insulating barrier to facilitate wrapping the second end around and forming a seal. A releasable member is secured along a first lateral side of the insulating barrier and a mating releasable member is secured along an opposite second lateral side of the insulating barrier and the releasable members facilitate releasable wrapping of the insulating barrier about and forming a seal with the component.

20 Claims, 7 Drawing Sheets

(56) References Cited

U.S. PATENT DOCUMENTS

| | | | |
|---|---|---|---|
| 4,295,669 A * | 10/1981 | LaPrade | F16L 59/184 285/419 |
| 4,556,082 A | 12/1985 | Riley et al. | |
| 4,696,324 A | 9/1987 | Petronko | |
| 4,791,236 A | 12/1988 | Klein et al. | |
| 4,807,669 A | 2/1989 | Prestidge, Sr. | |
| 4,925,605 A * | 5/1990 | Petronko | F16L 59/04 264/230 |
| 4,930,543 A | 6/1990 | Zuiches | |
| 5,025,836 A | 6/1991 | Botsolas | |
| 5,027,862 A | 7/1991 | Laybourn | |
| 5,112,661 A | 5/1992 | Pendergraft et al. | |
| 5,158,114 A | 10/1992 | Botsolas | |
| RE34,832 E * | 1/1995 | Lechuga | F16L 59/168 137/375 |
| 5,522,433 A | 6/1996 | Nygaard | |
| 5,713,394 A | 2/1998 | Nygaard | |
| 5,901,756 A | 5/1999 | Goodrich | |
| 5,941,287 A | 8/1999 | Terito, Jr. et al. | |
| 5,967,194 A | 10/1999 | Martin | |
| 6,012,480 A | 1/2000 | Helmsderfer | |
| 6,019,136 A | 2/2000 | Walsh et al. | |
| 6,491,067 B1 | 12/2002 | Davenport et al. | |
| 6,907,907 B2 | 6/2005 | Maida | |
| 7,159,620 B2 * | 1/2007 | Kissell | F16L 59/026 138/149 |
| 7,914,872 B2 * | 3/2011 | Leonard | B32B 3/28 428/102 |
| 2004/0103949 A1 | 6/2004 | Rickards | |
| 2004/0116023 A1 * | 6/2004 | Huang | A61F 13/06 442/328 |
| 2011/0240166 A1 * | 10/2011 | Collier | F16L 59/022 138/149 |
| 2012/0073693 A1 * | 3/2012 | Collier | B32B 3/06 138/103 |
| 2012/0097194 A1 * | 4/2012 | McDaniel | A01N 63/02 134/26 |
| 2014/0004295 A1 * | 1/2014 | Kiederle | A41D 31/0027 428/101 |

* cited by examiner

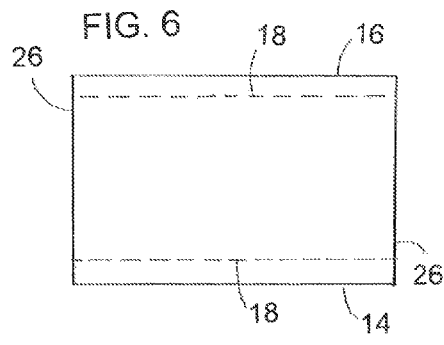
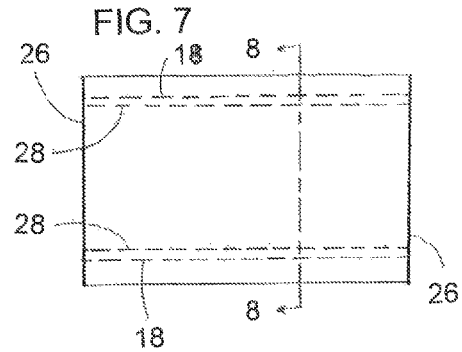
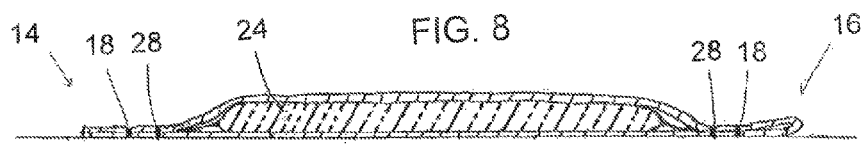
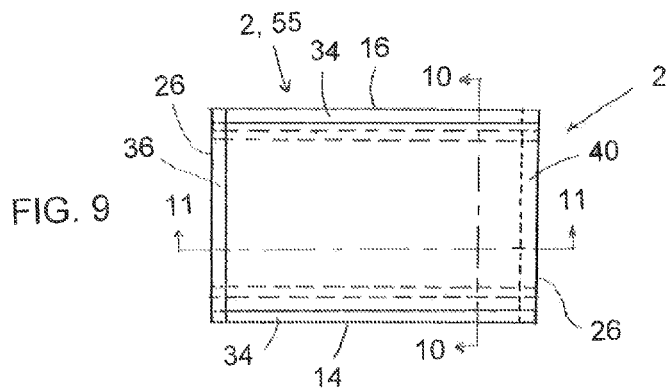
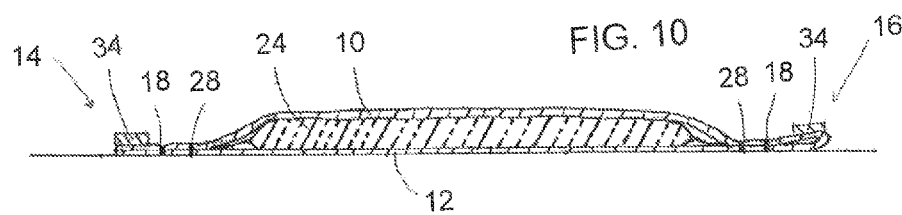
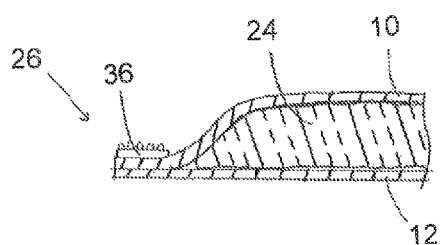
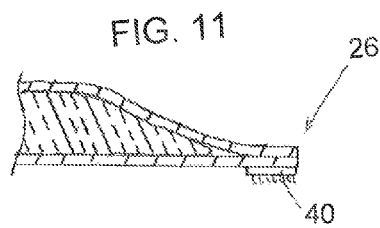

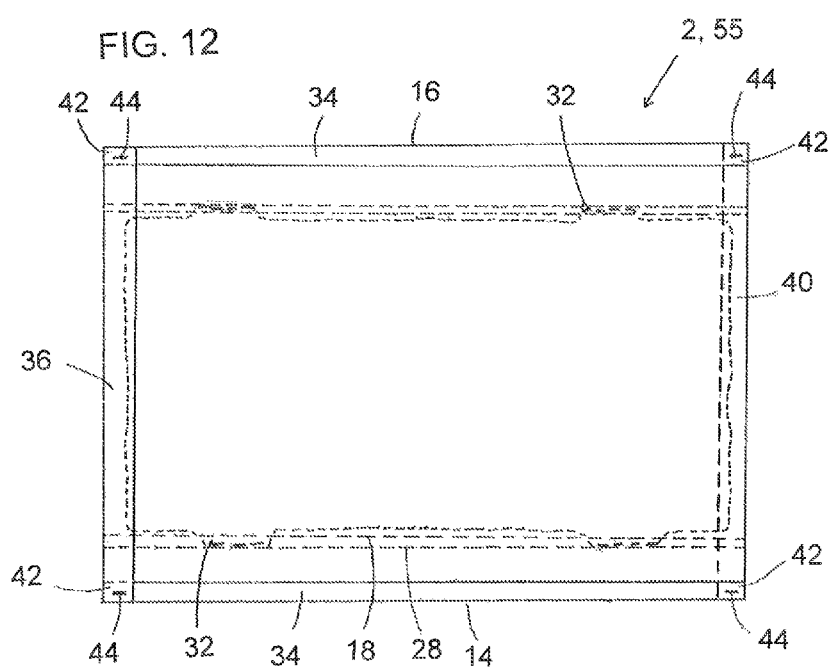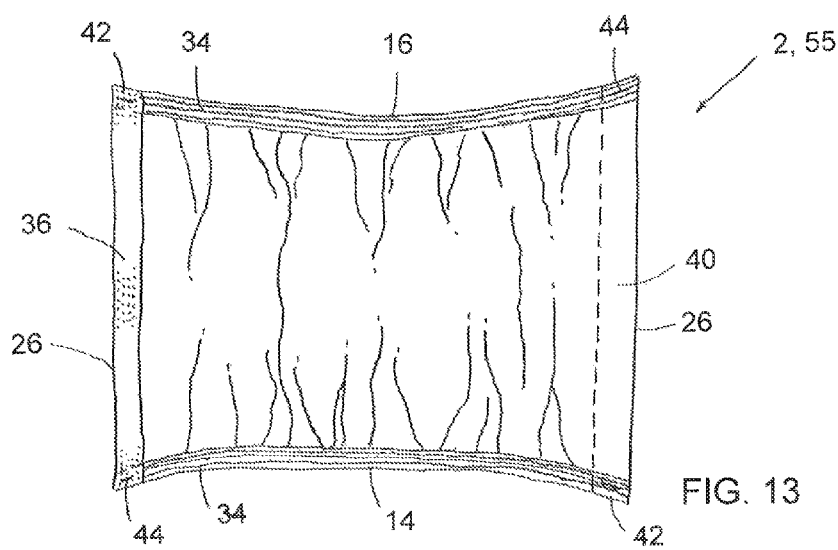

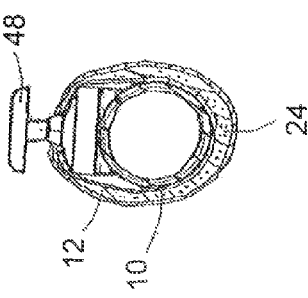
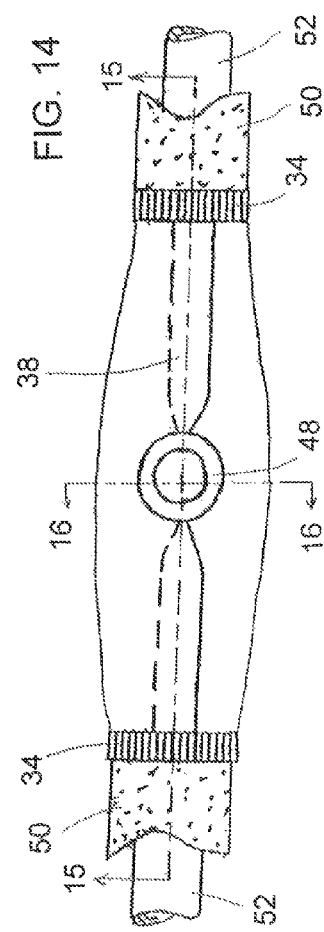
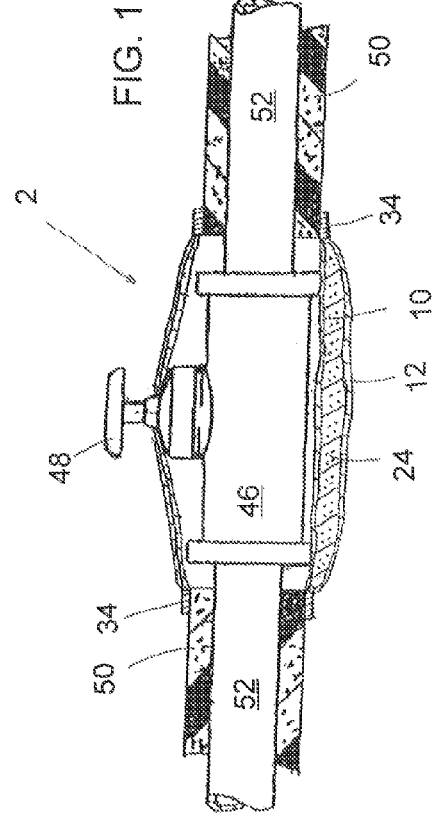

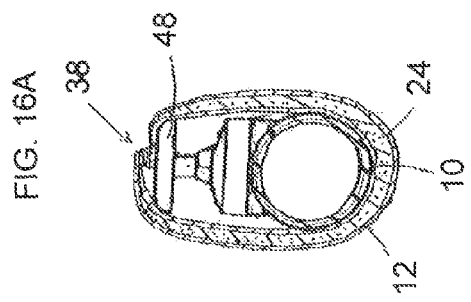
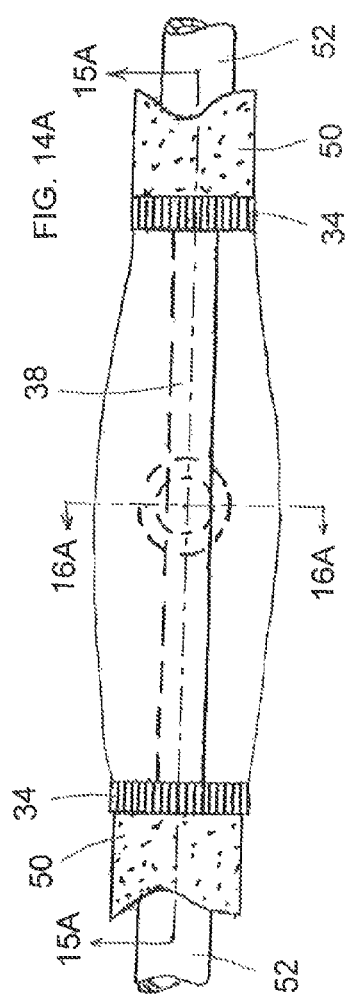
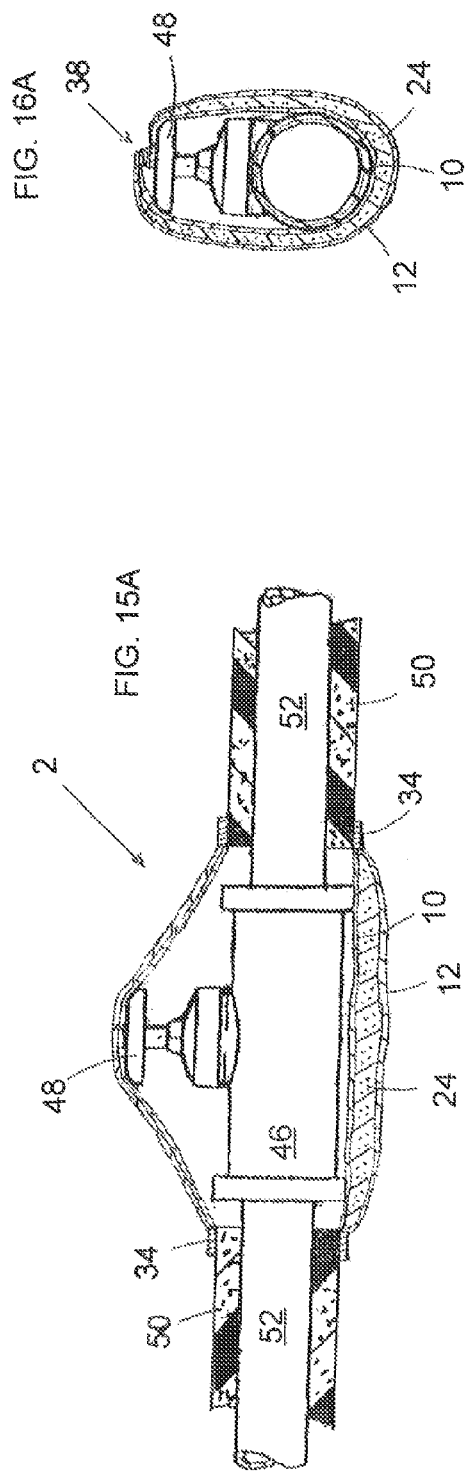

MULTILAYERED PIPE VALVE INSULATION COVER

FIELD OF THE INVENTION

The present invention relates to a pipe valve insulation cover, having captively retained insulation, so that the pipe valve insulation cover is easy to remove, when access to a desired valve is required, and is easy to reapply properly to the valve, following access thereto.

BACKGROUND OF THE INVENTION

It is to be appreciated that when access to an insulated pipe valve is necessary for valve maintenance, servicing, repair and the like, the insulation located around and surrounding the valve is often partially destroyed or compromised in some fashion. Moreover, once the insulation is removed from the valve, it is often difficult for a technician, working on or servicing the valve, to properly reinstall the insulation around the valve so that the insulation will provide the necessary insulation to the valve following servicing. Moreover, in some instances, it is possible that the technician may simply reinstall the exterior cover of the insulation, without the insulation being reinstalled. In either event, the exterior cover alone or the exterior cover and the improperly installed insulation generally do not provide the necessary insulation to the valve and this, in turn, eventually leads to condensation problems and other issues.

SUMMARY OF THE INVENTION

Wherefore, it is an object of the present invention to overcome the above mentioned shortcomings and drawbacks associated with the prior art exterior covers and separate insulation materials.

Another object of the invention is too provided a removable insulating barrier that captively retains insulation therein so that the insulating barrier can be easily wrapped around the desired valve or other component to be insulated, while also allowing easy removal and reapplication of the insulating barrier when access to the valve or other component is required.

Another object of the invention is to provide a removable and reusable insulating barrier which is of a very simple design and is easy to manufacture.

Still another object of the invention is to provide a removable and reusable insulating barrier which can be easily removed, from a desired valve or other component to be insulated, and then can be easily and properly reinstalled on the valve or other component to be insulated following desired access, servicing or maintenance thereof.

Yet another object of the invention is to provide a substantially impermeable insulating barrier, between the insulation and the valve or other component to be insulated, so as to prevent the insulation from becoming wet, damp or saturated with moisture and, thereafter, compromise and/or reduce the insulating capability of the insulation.

A further object of the invention is to captively retain insulation within an integral pocket, formed between at least two layers forming the insulation barrier, so as to prevent the inadvertent and undesired escape of any loose insulation, particles, debris, fibers or other material from the integral pocket and thereby permanently retain the insulation.

A still further object of the invention is to provide an exposed surface of the insulating barrier with an absorbent material which facilitates absorbing and/or wicking of any moisture that may condense and/or collect on the exterior surface of desired valve or other component to be insulated.

The present invention also relates to a multilayered nonwoven insulating barrier with an integral pocket for facilitating installation of a component to be insulated, the insulating barrier comprising: at least first and second nonwoven layers overlapping one another and being stitched with one another by first pair of seams so as to form an integral pocket therebetween; a first elastic member being secured to a first end of the insulating barrier to facilitate wrapping the first end around and forming a seal with the component and a second elastic member being secured to an opposed second end of the insulating barrier to facilitate wrapping the second end around and forming a seal with the component; and a first releasable member being secured along a first side of the insulating barrier and a mating second releasable member being secured along an opposed second side of the insulating barrier and the first and the second releasable members facilitate releasable wrapping of the insulating barrier about the component and forming a seal therewith.

The present invention also relates to a method of forming a multilayered nonwoven insulating barrier with an integral pocket which facilitates insulation of a component to be insulated, the method comprising the steps of: folding a nonwoven material on top of itself to form a multilayered barrier; stitching a first seam along each opposed first and second edges of the multilayered barrier to form an integral pocket between the overlapped layers and secure overlapped layers to one another; inserting an insulating material into the integral pocket; securing a respective elastic member to each of opposite first and second sides of the multilayered barrier such that each elastic member facilitates forming a seal with the component to be insulated; securing a first releasable member along one edge of the multilayered barrier and securing a mating second releasable member along an opposite second edge of the multilayered member so as to retain the insulating member within the integral pocket, and the first and the second releasable members being releasably coupleable with one another so as to facilitate sealing the component to be insulated within the multilayered nonwoven insulating barrier.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIG. 6 is a diagrammatic top plan view showing a single insulating barrier after the step of cutting the folded nonwoven to a desired width;

FIG. 7 is a diagrammatic top plan view of the insulating barrier of FIG. 6 following the step of stitching a second pair of lateral seams along the partially formed insulating barrier;

FIG. 8 is a diagrammatic cross sectional view of the partially formed insulating barrier, viewed along section line 8-8 of FIG. 7, following insertion of insulating material into the integral pocket and sewing of a second pair of seams;

FIG. 9 is diagrammatic top plan view of the partially formed insulating barrier following the steps of securing elastic bands and fasteners about the perimeter of the insulating barrier;

FIG. 10 is a diagrammatic cross sectional view of the partially formed insulating barrier viewed along section line 10-10 of FIG. 9;

FIG. 11 is a partial diagrammatic cross sectional view of the partially formed insulating barrier viewed along section line 11-11 of FIG. 9;

FIG. 12 is a diagrammatic top plan view of the insulating barrier illustrating a general position of the insulating material, within the insulating barrier, following the step of tacking the corners of the insulating barrier;

FIG. 13 is a diagrammatic top view of the insulating barrier with an integral pocket manufactured by the manufacturing process according to the present invention;

FIG. 14 is a diagrammatic top plan view of the insulating barrier, with an integral pocket according to the present invention, showing a first installation position with respect to a valve;

FIG. 14A is a diagrammatic top plan view of the insulating barrier, with an integral pocket according to the present invention, showing a second installation position with respect to a valve;

FIG. 15 is a diagrammatic longitudinal cross-sectional view of the first installation of the insulating barrier with an integral pocket along section line 15-15 of FIG. 14;

FIG. 15A is a diagrammatic longitudinal cross-sectional view of the second installation of the insulating barrier with an integral pocket along section line 15A-15A of FIG. 14A;

FIG. 16 is a diagrammatic transverse cross-sectional end view of the first installation, of the insulating barrier with an integral pocket, along section line 16-16 of FIG. 14;

FIG. 16A is a diagrammatic transverse cross-sectional end view of the second installation, of the insulating barrier with an integral pocket, along section line 16A-16A of FIG. 14A;

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning now to FIGS. 1-13, a brief description concerning the various components of a first embodiment of the insulating barrier with an integral pocket, according to the present invention, will now be briefly discussed. The process for manufacturing the insulating barrier with an integral pocket will first be described and this will be followed by a description relating to use of the insulating barrier with an integral pocket to insulate a valve, for example.

Figure 1:
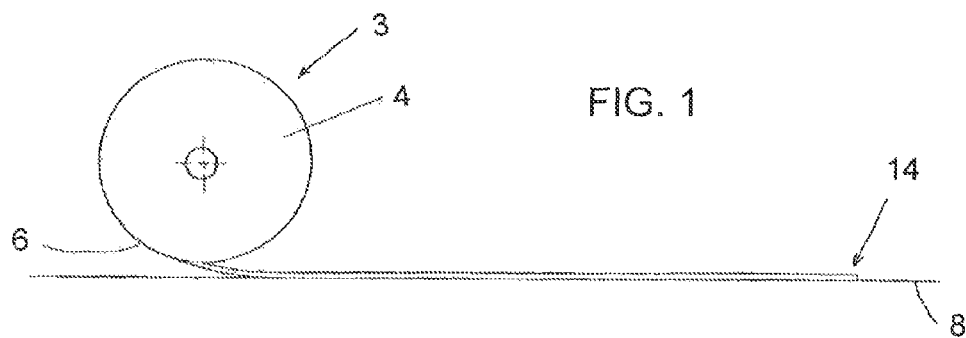
FIG. 1 is a diagrammatic side view of a roll of nonwoven material showing the first step of the manufacturing process for producing the insulating barrier.
Figure 1A:
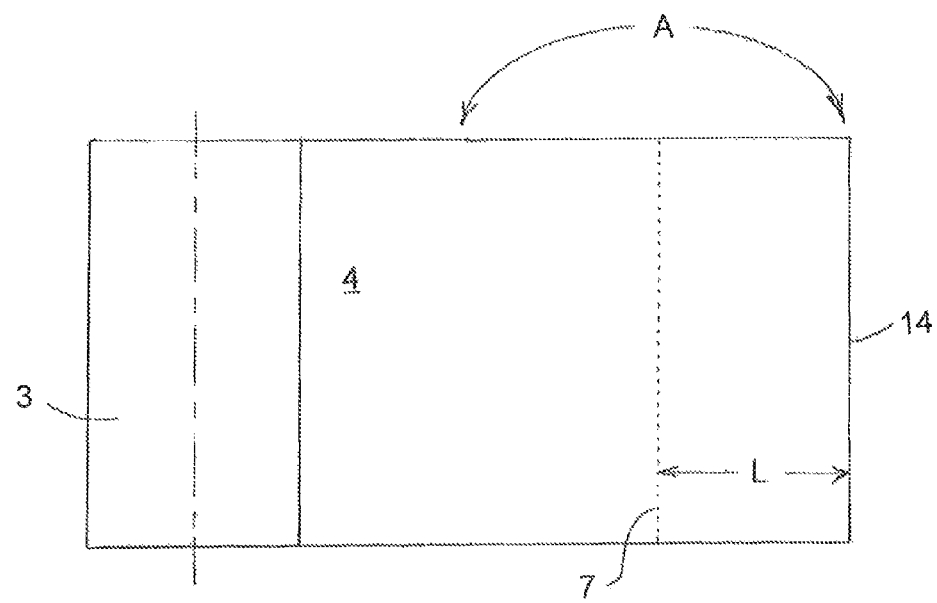
FIG. 1A is a diagrammatic top plan view of the partially unrolled roll of nonwoven material of FIG. 1.

The insulating barrier with integral pocket 2 generally comprises a nonwoven material 4 which typically has a thickness of between 2 and 12 mils and a very low permeability (perm) ratio, e.g., a perm ratio of between 0.005 and 0.03. Preferably, at least one surface 6 of the nonwoven material 4 is an absorbent material, such as polypropylene, which facilitates absorbing and/or wicking of moisture away from a valve, pipe, component or other object or item to be sealed and insulated. As shown in FIG. 1, a roll 3 of the nonwoven material 4 is typically laid on a flat support surface 8, for example, with the absorbent side 6 facing toward the support surface 8 and a leading edge 14 of the nonwoven material 4 is partially unwound and located remote from a remainder of the roll 3. The nonwoven material 4 is then folded along a fold line 7, shown in FIG. 1A as a dotted line, over on top of itself, as generally indicated by arrow A in FIG. 1A, so as to form an overlapped, two layer barrier or batt 9 of nonwoven material 4 having a top layer 10 and a bottom layer 12 (see FIGS. 1B and 3). The distance from the leading edge 14 and the fold line 7, about which the nonwoven material is folded, is generally the overall length L of the insulating barrier with integral pocket 2, as will be discussed below in further detail.

Figure 1B:
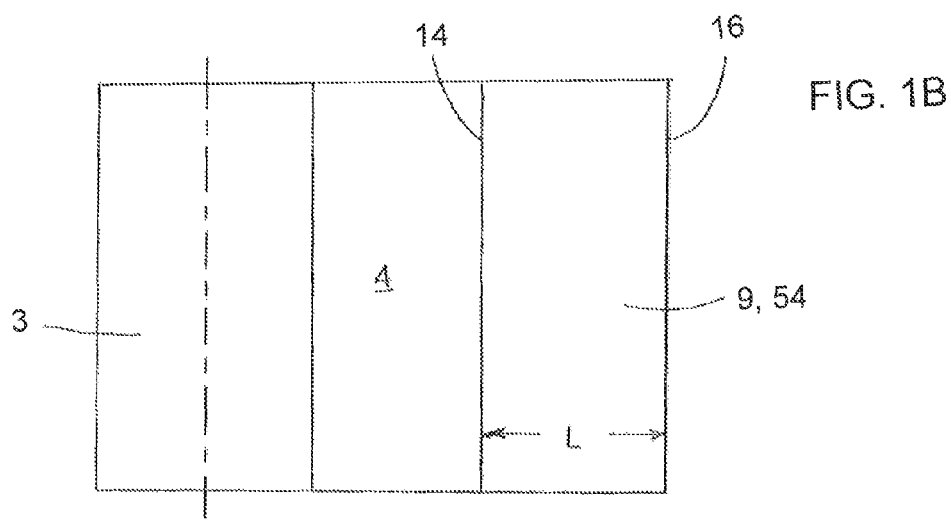
FIG. 1B is a diagrammatic top plan view of the partially unrolled roll of nonwoven material of FIG. 1A, following folding of the leading edge.

FIG. 1B shows the two layer batt 9 following the step of folding the nonwoven material 4 but prior to cutting the two layer batt 9 from a remainder of the roll 3 of the nonwoven material 4 along and coincident with the leading edge 14. Once the nonwoven material 4 is folded on top of itself, the fold line 7 generally becomes a folded trailing edge 16 of the two layer batt 9.

Figure 4:
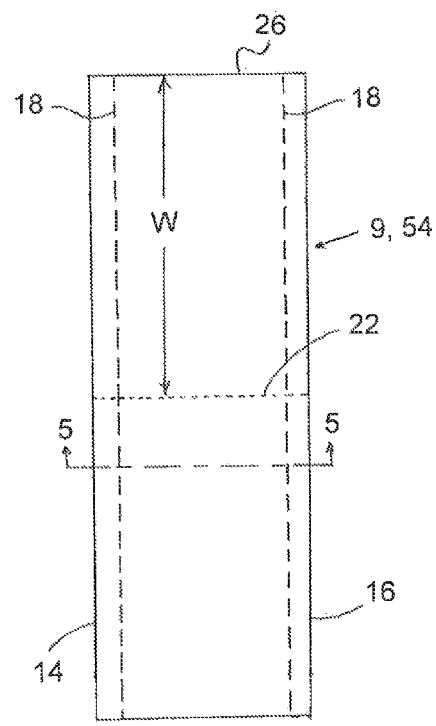
FIG. 4 is a diagrammatic top plan view of the folded insulating barrier following the step of sewing a first pair of lateral seams along the insulating barrier.
Figure 3:
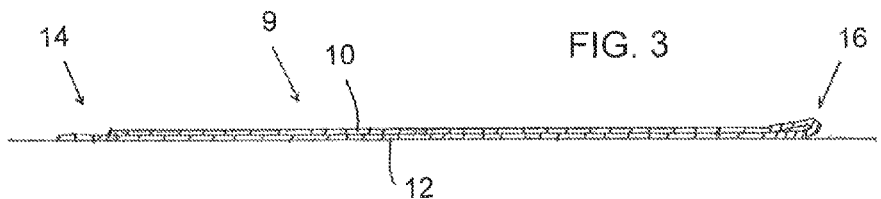
FIG. 3 is a diagrammatic cross sectional view of the folded nonwoven material, viewed along section line 3-3 of FIG. 2.
Figure 5:
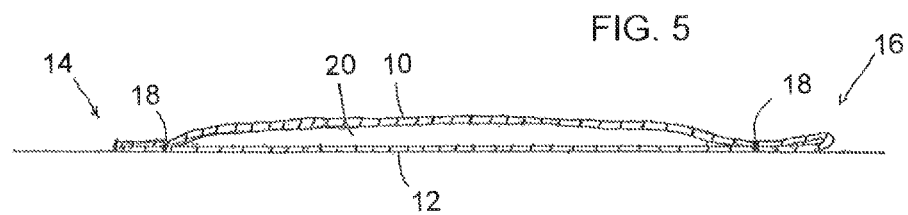
FIG. 5 is a diagrammatic cross sectional view of the partially manufactured insulating barrier, viewed along section line 5-5 of FIG. 4.

Next, a first pair of spaced apart lateral seams 18 are stitched along the entire width of the two layer batt 9 of nonwoven material 4, as generally shown in FIGS. 4 and 5, thereby to form an elongate integral pocket 20 between the first pair of spaced apart seams 18 and the top and bottom layers 10, 12 of the two layer batt 9. The first pair of spaced apart lateral seams 18 also facilitate forming an integral nonwoven structure which assists with further handling thereof without the top and bottom layers 10, 12 of the two layer bait 9 moving, separating and/or shifting with respect to one another during the manufacturing process. Typically, each one of the first pair of lateral seams 18 is located between about an 1 inch to about 2 inches, preferably about 1½ inches or so, from the opposed the leading and trailing edges 14, 16 of the two layer batt 9. It is to be appreciated, however, that the location of the first pair of spaced apart seams 18 can vary, from application to application, without departing from the spirit and scope of the present invention.

The overlapped nonwoven material 4 of the two layer batt 9 is then cut transversely, at a desired distance(s), generally perpendicularly to the leading and trailing edges 14, 16 and the first pair of spaced apart lateral seams 18. These transverse cuts, illustrated as dashed lines 22 in FIG. 4, define the side edges 26 and the width W of each individual insulating barrier with an integral pocket 2 so that a plurality of separate and discrete insulating barriers, each being provided with an integral pocket 20, as generally indicated in FIGS. 4, 6 and 7 are typically formed for a single elongate batt 9. Each one of the insulating barriers with integral pocket 2, will typically have a length L dimension of between about 10 inches to about 48 inches or so and a width W dimension of between about 6 inches to about 40 inches or so. Although the width W of the insulating barrier with integral pocket 2 is illustrated in the Figures as being longer than the length L, it is to be appreciated that the length L and/or the width W of the insulating barrier with integral pocket 2, can both vary, from application to application, without departing from the spirit and scope of the present invention. That is to say the length L of the insulating barrier with integral pocket 2 may be greater than the width W depending on the specific requirements of the particular application. It is to be further appreciated that the width W dimension of the insulating barrier with integral pocket 2 generally corresponds to a combination of the overall height and width dimensions of the pipe, valve, component or other object or item to be sealed and insulated, as will be described in further detail.

As noted above, each of the cut and laterally seamed layers 10, 12 of nonwoven material 4 forms an integral pocket 20 therebetween for receiving a piece or layer of insulating material 24, such as a unitary piece of fiberglass insulation (see FIG. 8). Each formed pocket 20 typically has a length L dimension of between 10 and 48 inches and a width dimension of between 4 and 13 inches, depending upon the overall dimensions, e.g., circumference of the valve or other component to be insulated.

In order to provide access to the integral pocket 20, the top and the bottom layers 10, 12 of the two layer batt 9 are sufficiently separated from one another so that a desired insulation, e.g., piece of insulating material 24, which is sized so as to be closely received and accommodated within the integral pocket 20, can be inserted into the pocket 20 from one of the side edges 26. Following insertion of the insulating material 24 into the integral pocket 20, a second pair of spaced apart lateral seams 28 are stitched along the entire width W of the top and bottom layers 10, 12 of the two layer batt 9 of the nonwoven material 4, as generally shown in FIGS. 7 and 8. Each one of the second pair of lateral seams 28 is spaced inward, by about ¼ to ⅜ of an inch or so, from the respective lateral seam of the first pair of seams 18. The second pair of seams 28 thereby further reduces the length dimension of the integral pocket 20 and thereby facilitates more closely captively retaining the accommodated insulating material 24 therein so as to minimize any undesired shifting or other movement of the insulation material 24 with respect to the integral pocket 20.

If desired, one or more stitches (not shown) can pass through both of the top and bottom layers 10, 12 of the two layer batt 9 as well as a portion of the insulating material 24 to provide a more secure attachment of the insulating material 24 to the integral pocket 20 and further minimize any undesired shifting or movement of the insulating material 24 with respect to the integral pocket 20. Alternatively, the insulating material 24 may be provided with one or more tabs or fingers 32 (see FIG. 12, for example) which can be directly stitched between the two overlapped layers 10, 12 of the nonwoven material when the second pair of lateral seams 28 are stitched.

Next, a first elastic band 34 is stitched along the leading edge 14 while a second elastic band 34 is stitched along the trailing edge 16 of the insulating barrier with integral pocket 2, as generally shown in FIGS. 9 and 10. Each elastic band 34 generally extends parallel to the first and second pairs of lateral seams 18, 28, but is spaced therefrom. The length of the elastic bands 34, stitched to each of the leading and trailing edges 14, 16 of the two layer batt 9, is selected so that the elastic bands 34 will be in a slightly expanded state when each the elastic band 34 engages and seals about a circumference of a desired pipe, valve, component or other object or item to be sealed, as discussed below in further detail. That is, following installation of the manufactured insulating barrier with integral pocket 2, each elastic band 34 is preferably in a sufficiently expanded state so as to form a substantially fluid tight seal, between each of the leading and the trailing edges 14, 16 of the manufactured insulating barrier with integral pocket 2, and the desired pipe, valve, component or other object or item to be sealed and insulated so as to prevent—or minimize to a great extent—the flow of any fluid, air and/or moisture past the formed seal.

Next, a first elongate strip 36 of releasable/resealable touch fastener 38 (e.g., Velcro®) is secured or stitched to the top layer 10 along the entire edge of one of the side edges 26 of the insulating barrier with integral pocket 2 with the hook or loop portion of the touch fastener 38 facing upward, as generally shown in FIG. 11. In addition, a second elongate strip 40 of a releasable/resealable touch fastener 38 (e.g., Velcro®) is secured or stitched to the bottom layer 12 along the entire edge of the other side edge 26 of the insulating barrier with integral pocket 2 with the other of the hook or loop portion of the touch fastener 38 facing downward, as generally shown in FIG. 11. As a result of such arrangement, when the first and second elongate strips 36, 40 of the releasable/resealable touch fasteners 38 overlap and mate with one another in a conventional manner, the mating touch fasteners 38 provides a secure, but releasable connection between the two opposed side edges 26 of the insulating barrier with integral pocket 2 with one another. In addition, the mating engagement of the releasable/resealable touch fastener 38 generally form a substantially fluid tight seal therebetween which prevents—or minimizes to a great extent—the flow of any fluid, air and/or moisture through the substantially fluid tight seal formed between the first and second elongate strips 36, 40 of the releasable/resealable touch fastener 38. While the mating elongate strips 36, 40 are preferably of the hook and loop variety, it is to be appreciated that other types of touch fasteners or other conventional fasteners may be utilized without departing from the spirit and scope of the present invention.

Following completion of the manufacturing process, each of the four corners 42 of the insulating barrier with integral pocket 2, receives a conventional bar tack 44, as generally shown in FIGS. 12 and 13, to prevent inadvertent separation of the elastic bands 34 and/or the first and second elongate strips 36, 40 of the releasable/resealable touch fasteners 38 from one another and/or the nonwoven material 4.

As a result of the above described manufacturing process, the insulation material 24 is captively received, retained and sandwiched between the top and bottom layers 10, 12 of the two layer batt 9 of nonwoven material 4 which have a low perm ratio. Both of the top and bottom layers 10, 12 of the nonwoven material 4, which captively receive and sandwich the insulating material 24 therebetween, prevent any of particles, debris and/or fibers of insulating material from passing through one of the layers 10 or 12 and becoming airborne. In addition, when the insulating barrier with integral pocket 2 is installed on the desired pipe, valve, component or some other object or item to be sealed, the opposing top and bottom layers 10, 12 of the nonwoven material 4 prevent any moisture from passing therethrough, in either direction (e.g., from the external environment located on the outside side of the insulating barrier or from the enclosed interior space of the insulating barrier into the insulation material), and thereby dampening or soaking the insulation material 24. Accordingly, the insulation material 24 is more inclined to stay dry and thereby retain its initial insulating capability and is thus virtually unaffected by moisture.

The insulating barrier with integral pocket 2, according to the present invention, is typically used in combination with any known inline pipe apparatus 46 that is subject periodic maintenance or operation such as a pipe valve which is connected to pipe or tubing, as generally shown in FIGS. 14-16 and 14A-16A, the inline pipe apparatus may comprise a permanent fixed operator/attachment 48 that is applicable either in or out of the mechanical insulation enclosure formed by the insulating barrier with integral pocket. In these Figures, the illustrated inline pipe apparatus 46 is a simple in-line gate valve having a handle or knob 48, but it is to be appreciated that other valve configurations may also be utilized in combination with the insulating barrier with integral pocket 2, without departing from the spirit and intent of the present invention. As generally shown, conventional insulating material 50 surrounds a section of the pipe 52 located on each opposed side of the valve 46. As is conventional in the art, the insulating material 50 may include an elongate radial seam which facilitates partial splitting of the insulating material 50 so that the insulating material may be easily wrapped or otherwise installed around the pipe 52 to facilitate insulation thereof.

In order to insulate the valve 46, the insulating barrier with integral pocket 2, according to the present invention, is simply wrapped around valve 46 so that each one of the elastic bands 34 surround and engage with the exterior surface of the insulating material 50 encasing the pipe 52, for example, and thereby form a substantially fluid tight seal with the exterior surface of the insulating material 50 which prevents—or minimize to a great extent—the flow of any fluid, air and/or moisture laterally, past the formed seal, toward the valve 46. To complete the installation process, the first elongate strip 36 of the releasable/resealable touch fastener 38 overlaps and mates with the second elongate strip 40 of the releasable/resealable touch fastener 38 so as to from a substantially fluid tight seal which also prevents— or minimize to a great extent—the flow of any fluid, air and/or moisture to the valve 46 passing through this seal formed by the mating touch fasteners 38. Accordingly, the insulating barrier with integral pocket 2 substantially surrounds and encases the valve 46 so as to prevent the flow of any fluid, air and/or moisture from the external environment to the valve 46.

As generally shown in FIGS. 14-16, the handle or knob 48, which facilitates operation/actuation of the valve 46, projects or extends out through the insulating barrier with integral pocket 2 without sufficiently compromising the formed seal. Alternatively, the insulating barrier with integral pocket 2 may completely encase and surround both the valve 46 as well as the handle or knob 48, as generally shown in FIGS. 14A-16A. In this case, it may be necessary to use a larger insulating barrier with integral pocket 2, for example, one having larger width W and/or length L dimensions so as to facilitate completely encasing and surrounding both the valve 46 as well as the handle or knob 48.

It is to be appreciated that the precise order or sequence of the steps, described above, for manufacturing the insulating barrier with integral pocket 2 can be varied without departing from the spirit and scope of the present invention. For example, the order in which the elastic bands 34 and the first and the second elongate strips 36, 40 of the releasable/resealable touch fastener 38 are stitched can be reversed or altered without departing from the spirit and scope of the present invention. In addition, the length L and the width W dimensions of the insulating barrier with integral pocket 2 can also be switched without departing from the spirit and scope of the present invention.

Figure 17:
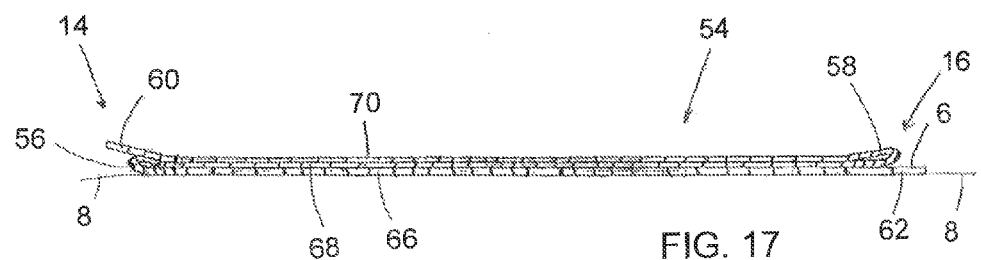
FIG. 17 is a diagrammatic cross sectional view of a second embodiment of the insulating barrier, according to the invention, following the steps of folding nonwoven material and cutting along the second fold/trailing edge to separate the folded three layer batt from a remainder of the roll of nonwoven material.
Figure 18:
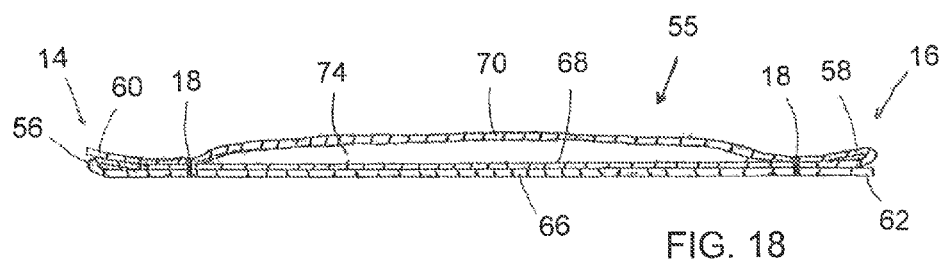
FIG. 18 is a diagrammatic cross sectional view of the second embodiment of the insulating barrier, according to invention, shown with an integral pocket defined by the first pair of lateral seams.
Figure 19:
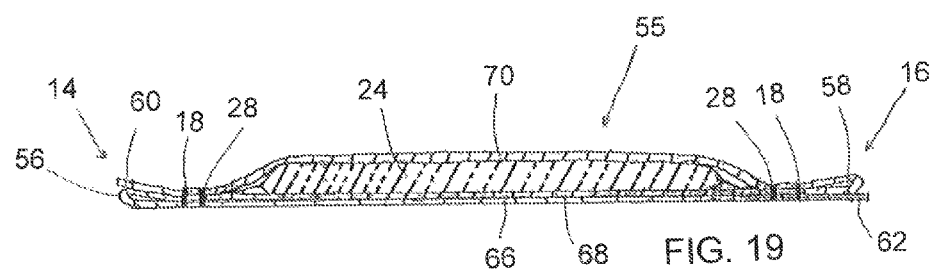
FIG. 19 is a diagrammatic cross sectional view of the second embodiment of the insulating barrier following the steps of inserting insulating material into the integral pocket and sewing a second pair of seams.

Turning now to FIGS. 17, 18 and 19, a brief description concerning a second embodiment of the present invention will now be described. It is to be appreciated that this embodiment is quite similar to the first embodiment the diagrammatic top plan views, i.e., FIGS. 2, 4, 6, 7, 9, 12 and 13 generally relate to both the first and the second embodiments. Due to the similarity of the two embodiments, only the differences between this embodiment and the first embodiment will be discussed in detail.

Figure 2:
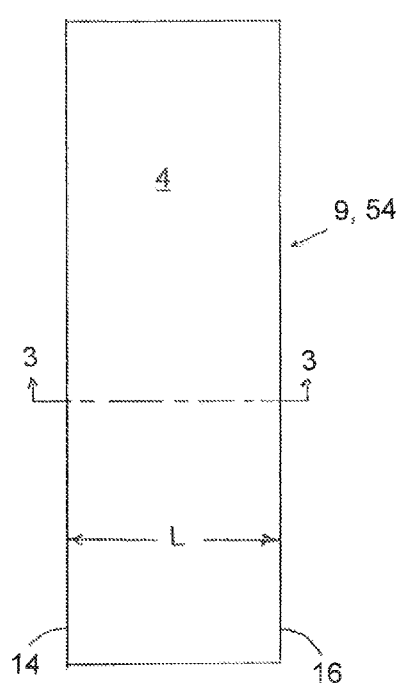
FIG. 2 is a diagrammatic top plan view of the folded insulating barrier, shown in FIG. 1A, following cutting along the leading edge to separate the folded batt from a remainder of the roll of nonwoven material.

As generally shown in FIGS. 1, 2 and 17, the nonwoven material 4 is laid on a flat support surface 8. Next, the leading end is first folded over on top of itself along a first fold line, and then again folded over on top of itself along a second fold line so as to form a three layered barrier or batt 54. It is to be appreciated in the case of folding a three layered barrier of batt 54, the leading end of the material can be folded forward on top of itself twice or the leading end of the material can be folded forward once and then folded backward once. The steps for folding the nonwoven material 4 so as to form three layers are not particularly crucial, however it is important that in the finished insulating barrier with integral pocket 2 absorbent side of the top layer of nonwoven material 4 faces the valve. As such the steps of folding the nonwoven material 4 to form three layers substantially depends on the orientation of the absorbent side of the nonwoven material 4 when unrolled from the roll 3. After the nonwoven material 4 has been folded, the three layer batt 54 is then cut so as to separate it from a remainder of the roll 3 of the nonwoven material 4. As shown in FIGS. 17, 18 and 19, the three layer batt 54 has a leading edge 14 and a trailing edge 16. The distance between the leading edge 14 of the three layer batt 54 and the trailing edge 16 of the three layer batt 54 defines the overall length L of the insulating barrier with integral pocket 74 to be manufactured.

Next, like the first embodiment, a first pair of spaced apart lateral seams 18 are stitched along the leading and trailing edges 14, 16 of the three layered batt 54, generally shown in FIG. 4, to thereby form an elongate integral pocket 74 between the first pair of spaced apart lateral seams 18 and the mid and the top layers 68, 70 of the nonwoven material 4 as well as form a second elongate integral pocket between the first pair of spaced apart lateral seams 18 and the bottom and mid layers 66, 68 of the nonwoven material 4. The first pair of opposed seams 18 also facilitate forming an integral nonwoven structure which assists with further handling thereof without the three overlapped layers 66, 68, 70 of the nonwoven material 4 becoming separated, shifting and/or moving with respect to one another during a remainder of the manufacturing process. Typically, each one of the first pair of lateral seams 18 is located between about an 1 inch to about 2 inches, preferably about 1½ inches or so, from the opposed leading and trailing edges 14, 16 of the three layered batt 54 of nonwoven material 4. It is to be appreciated, however, that the location of the first pair of lateral seams 18 can vary, from application to application, without departing from the spirit and scope of the present invention.

The three layered batt 54 of the nonwoven material 4 is then cut to have a desired width or circumference W and thereby form a plurality of separate and discrete insulating barriers 55, each being provided with an integral pocket 74 as generally indicated in FIGS. 6 and 18. Each one of the insulating barriers 55 with integral pocket 74, will typically have a length L of between about 10 inches to about 48 inches or so and a width W or circumference of between about 6 inches to about 40 inches or so. It is to be appreciated that the length L and/or the width W of the insulating barrier 55 with integral pocket 74, can vary, from application to application, without departing from the spirit and scope of the present invention.

As noted above, the three overlapped layers 66, 68, 70 of the nonwoven material 4 which has been cut and laterally seamed forms an integral pocket 74 for receiving a piece or layer of insulating material 24, such as a unitary piece of fiberglass insulation. The integral pocket 74 typically has a length dimension L of between 10 and 48 inches and a width dimension W of between 4 and 38 inches, depending upon the overall circumference of the pipe, valve, component or some other object or item to be sealed.

In order to provide access to the integral pocket 74, the mid and the top layers 68, 70 of the nonwoven material 4 are sufficiently separated from one another so that a desired piece of insulating material 24, which is sized so as to be closely received and accommodated within the integral pocket 74, is inserted into the integral pocket 74 from one of the side edges 26. Following insertion of the insulating material 76 within the integral pocket 74, a second pair of spaced apart seams 28 are stitched along the entire width W of the three overlapped layers 66, 68, 70 of the three layered batt 54 of nonwoven material 4, as generally shown in FIGS. 7 and 19. Each of the second pair of lateral seams 28 is spaced radially inward, by about ¼ to ⅜ of an inch or so, from the respective seam of the first pair of lateral seams 18. The second pair of lateral seams 28 further reduce the overall size or dimension of the integral pocket 74 and thereby facilitates more a close, captive retaining the insulating material 24 therein so as to minimize any undesired shifting or movement of the insulating material 24 with respect to the integral pocket 74. If desired, one or more stitches (not shown) can pass through the three overlapped layers 66, 68, 70 of the nonwoven material 4 and a desired portion of the insulating material 24 to provide a more secure attachment of the insulating material 24 to the integral pocket 74 and further minimize any undesired shifting or movement of the insulating material 24 with respect to the integral pocket 74. Alternatively, the insulating material 24 may be provided with one or more tabs or fingers 32 which can be directly stitched between the mid and the top overlapped layers 68, 70 of the nonwoven material 4 when the second pair of lateral seams 28 are stitched.

Next, as shown and described above with respect to FIG. 9, the elastic bands 34 are then respectively stitched along both of the leading and the trailing edges 14, 16 of the three overlapped layers 66, 68, 70 of the nonwoven material 4 and the first and the second elongate strips 36, 40 of the releasable/resealable touch fastener 38 are then respectively stitched to one of the opposed side edges 26 of the three overlapped layers 66, 68, 70 of the nonwoven material 4, as generally described above, to complete manufacture of the insulating barrier with an integral pocket 74.

Since the insulating barrier with integral pocket 2, 55 captively retains the insulating material 24, in the event that any service personnel removes the insulating barrier with integral pocket 2, 55 for servicing of the valve, for example, it is quite easy and simple for the such service personnel to reinstall the insulating barrier with integral pocket 2, 55 without any formal training or an elaborate process. That is, the service personnel merely repeats the above procedure in the reverse order. Accordingly, the insulating barrier with integral pocket 2, 55, can be easily removed and consistently and reliably reinstalled by both trained and untrained personnel alike. As a result, the insulating barrier with integral pocket 2, 55 according to the present invention, following reinstallation thereof, is continuously able to provide the desired insulation to the desired valve, component or other object or item to be insulated.

Preferably the surface of the nonwoven material, which is located closely adjacent and possibly in contact with the valve, or other component to be insulated, carries the absorbent coating or material. Such absorbent coating or material facilitates wicking moisture away from the valve, or other component to be insulated, while the low perm ratio of the nonwoven material prevents, or significantly minimizes, moisture from passing therethrough and saturating the insulating material. As a result, the insulating material generally remains dry and thus constantly and continuously retains its initial and normal insulating ability and capacity.

It is to be appreciated that while the above description describes folding the leading edge over onto a remainder of the batt, it is understood and readily apparent those skilled in the art that one side edge may be folded over onto the opposite side edge without departing from the spirit and scope of the present invention. That is, is not critical which way or manner the nonwoven material is folded over upon itself, important aspect is that a folder over multilayer batt results which facilitates formation of an internal pocket therein which is able to captively received and retained a desired piece of insulation.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

I claim:

1. A multilayered nonwoven insulating barrier with an integral pocket for facilitating installation of a component to be insulated, the insulating barrier comprising:

at least first and second layers of nonwoven material overlapping one another and being stitched with one another by a first pair of seams so as to form the integral pocket therebetween;

insulation being accommodated within the integral pocket;

an elongate first elastic member being secured to a first end of the insulating barrier and extending along the first end from a first side of the insulating barrier to an opposed second side of the insulating barrier to facilitate wrapping the first end around and forming a first seal with the component to be insulated;

an elongate second elastic member being secured to an opposed second end of the insulating barrier and extending along the second end from the first side to the second side to facilitate wrapping the second end around and forming a second seal with the component to be insulated;

a first releasable member being secured along the first side of the insulating barrier and a mating second releasable member being secured along the opposed second side of the insulating barrier; and the first and the second releasable members facilitate releasable wrapping of the insulating barrier about the component to be insulated and forming a third seal therewith.

2. The multilayered nonwoven insulating barrier with the integral pocket according to claim 1, wherein each of the first and the second layers of the nonwoven material are substantially impermeable to moisture so as to resist moisture from passing through the nonwoven material and saturating the insulation accommodated within the integral pocket.

3. The multilayered nonwoven insulating barrier with the integral pocket according to claim 1, wherein a second pair of spaced apart seams are stitched along the first and the second overlapped layers of the nonwoven material radially inward from the respective seam of the first pair of seams so as to reduce a size of the integral pocket.

4. The multilayered nonwoven insulating barrier with the integral pocket according to claim 1, wherein at least one surface of the nonwoven material is coated with an absorbent material which facilitates at least one of absorbing and wicking of moisture away from the component to be insulated.

5. The multilayered nonwoven insulating barrier with the integral pocket according to claim 1, wherein the first pair of seams are stitched along an entire length of the insulating barrier, and each one of the first pair of seams is located between 1 inch and 2 inches from a lateral edge of the insulating barrier.

6. The multilayered nonwoven insulating barrier with the integral pocket according to claim 5, wherein a second pair of seams are stitched along the first and the second overlapped layers of the nonwoven material to reduce a size of the integral pocket and thereby facilitate more intimate captive retention of the insulation accommodated within the integral pocket and minimize shifting or movement of the insulation with respect to the integral pocket.

7. The multilayered nonwoven insulating barrier with the integral pocket according to claim 6, wherein each of the second pair of seams is spaced radially inward by a distance of between about ¼ and about ⅜ inches from the respective seam of the first pair of seams.

8. The multilayered nonwoven insulating barrier with the integral pocket according to claim 1, wherein the insulating barrier has a length of between about 10 inches to about 48 inches and a width of between about 6 inches and about 40 inches or so, opposite ends of the first elastic member overlap an end of a respective one of the first and the second releasable members, and opposite ends of the second elastic member overlap an opposite end of a respective one of the first and the second releasable members.

9. The multilayered nonwoven insulating barrier with the integral pocket according to claim 1, wherein the integral pocket has a length of between about 10 inches to about 48 inches and a width of between about 4 inches and about 38 inches or so, the first releasable member extending along an entirety of the first side of the insulating barrier and the second releasable member extending along an entirety the second side of the insulating barrier.

10. The multilayered nonwoven insulating barrier with the integral pocket according to claim 1, wherein the multilayered nonwoven insulating barrier comprises a third nonwoven layer, in addition to the first and the second layers of the nonwoven material, and the integral pocket is formed between the first and the second layers of the nonwoven material.

11. The multilayered nonwoven insulating barrier with the integral pocket according to claim 1, wherein the first and the second releasable members extend from the first end of the insulating barrier to the second end of the insulating barrier.

12. The multilayered nonwoven insulating barrier with the integral pocket according to claim 11, wherein the first and the second ends of the insulating barrier delimit an entire length of the insulating barrier, and the first releasable member is secured to the first side along the entire length of the insulating barrier and the second releasable member is secured to the second side along the entire length of the insulating barrier such that the first and the second releasable members are mateable with each other along the entire length of the insulating barrier.

13. The multilayered nonwoven insulating barrier with the integral pocket according to claim 1, wherein in an installed position of the insulating barrier, in which the insulating barrier is releasably wrapped about the component to be insulated, the first elastic member encircles the component to be insulated and one end of the first elastic member overlaps an opposite end of the first elastic member thereby forming the first seal with the component to be insulated, and the second elastic member encircles the component to be insulated and one end of the second elastic member overlaps an opposite end of the second elastic member thereby forming the second seal with the component to be insulated.

14. The multilayered nonwoven insulating barrier with the integral pocket according to claim 1, wherein the first and the second layers of the nonwoven material each have an exterior facing surface that is opposite from the integral pocket, the first and the second elastic members are secured to the exterior facing surface of the first layer, the first releasable member is secured on the exterior facing surface of one of the first and the second layers and the second releasable member is secured on the exterior facing surface of the other one of the first and the second layers.

15. The multilayered nonwoven insulating barrier with the integral pocket according to claim 1, wherein the first and the second elastic members are secured, in an expanded state, to the first and the second ends of the insulating barrier, respectively such that, in an installed position of the insulating barrier in which the insulating barrier is releasably wrapped about the component to be insulated, the first and the second elastic members are at least partially expanded to respectively form the first and the second seals with the component to be insulated.

16. A multilayered nonwoven insulating barrier for insulating a component, the insulating barrier comprising:
at least first and second layers of a nonwoven material overlapping one another, the first and the second layers are secured to one another by a first pair of seams to form a batt, and an integral pocket being formed between the first and the second layers and between the seams of the first pair of seams;
an insulating material being accommodated within the integral pocket;
the batt having opposed first and second side edges and opposed first and second end edges, a distance from the first side edge to the second side edge being a width of the insulating barrier, and a distance from the first end edge to the second end edge being a length of the insulating barrier;
an elongate first elastomeric member is secured to the batt along the first end edge such that the width of the insulating barrier along the first end edge is elastically adaptable, the first elastomeric member extends from the first side edge to the second side edge, and an elongate second elastomeric member is secured to the batt along the second end edge such that the width of the insulating barrier along the second end edge is elastically adaptable, and the second elastomeric member extends from the first side edge to the second side edge;
an elongate first releasable member is secured to the batt along the first side edge and extends from the first end edge to the second end edge, and an elongate second releasable member is secured to the batt along the second side edge and extends from the first end edge to the second end edge;
the first releasable member being releasably couplable to the second releasable member to partially define an interior area of the insulating barrier and form a third seal along the first and the second side edges, the component to be insulated being located within the interior area of the insulating barrier when the insulating barrier is installed on the component to be insulated;
the first end edge being elastically adaptable to contact and form a first seal with the component to be insulated along the first end edge and to further define the interior area of the insulating barrier;
the second end edge being elastically adaptable to contact and form a second seal with the component to be insulated along the second end edge and to additionally define the interior area of the insulating barrier; and
the first, the second and the third seals at least reducing a flow of at least one of fluid, air and moisture between the interior area of the insulating barrier and an exterior of the insulating barrier.

17. The multilayered nonwoven insulating barrier according to claim 16, wherein the first and the second layers of the nonwoven material are formed by a single continuous sheet of the nonwoven material, the single continuous sheet of the nonwoven material being folded onto itself at either the first end edge or the second end.

18. The multilayered nonwoven insulating barrier according to claim 17, wherein the single continuous sheet of the nonwoven material has first and second surfaces, and, when the insulating barrier is installed on the component to be insulated, the first surface of the single continuous sheet faces the interior area and the exterior of the insulating barrier, and the second surface of the single continuous sheet faces the integral pocket.

19. The multilayered nonwoven insulating barrier according to claim 18, wherein one of the first and the second surfaces of the single continuous sheet is laminated and at least substantially impermeable to moisture to resist moisture from passing through the nonwoven material and saturating the insulation accommodated within the integral pocket; and
the other one of the first and the second surfaces of the single continuous sheet is coated with an absorbent material which facilitates at least one of absorbing and wicking of moisture away from the component to be insulated.

20. A multilayered nonwoven insulating barrier with an integral pocket for facilitating installation of a component to be insulated, the insulating barrier comprising:
at least first and second nonwoven layers overlapping one another and being stitched with one another by a first pair of seams so as to form the integral pocket therebetween;
insulation being accommodated within the integral pocket;
an elongate first elastic member being secured to a first end of the insulating barrier and extending along the first end from a first side of the insulating barrier to an opposed second side of the insulating barrier to facilitate wrapping the first end around and forming a first seal with the component to be insulated, the first elongate first elastic member having an unstretched length which is short than a length of the first end of the insulating barrier so that the first elastic member is at least partially stretched when forming the first seal with the component to be insulated;
an elongate second elastic member being secured to an opposed second end of the insulating barrier and extending along the second end from the first side to the second side to facilitate wrapping the second end around and forming a second seal with the component to be insulated, the second elongate elastic member having an unstretched length which is short than a length of the second end of the insulating barrier so that the second elastic member is at least partially stretched when forming the second seal with the component to be insulated;
a first releasable member being secured along the first side of the insulating barrier and a mating second releasable member being secured along the opposed second side of the insulating barrier; and
the first and the second releasable members facilitate releasable wrapping of the insulating barrier about the component to be insulated and forming a third seal therewith.

* * * * *